United States Patent
Lee et al.

(10) Patent No.: US 10,704,520 B2
(45) Date of Patent: Jul. 7, 2020

(54) METHOD AND SYSTEM FOR CONTROLLING ACTIVATION OF VEHICLE ENGINE IDLE STOP AND GO

(71) Applicants: Hyundai Motor Company, Seoul (KR); Kia Motors Corporation, Seoul (KR)

(72) Inventors: Jason Hoon Lee, Ann Arbor, MI (US); Sejun Kim, Seoul (KR); Kwangwoo Jeong, Ann Arbor, MI (US); Byungho Lee, Ann Arbor, MI (US)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 0 days.

(21) Appl. No.: 16/196,326

(22) Filed: Nov. 20, 2018

(65) Prior Publication Data

US 2020/0158070 A1   May 21, 2020

(51) Int. Cl.
*F02N 11/08* (2006.01)
*G01S 19/42* (2010.01)

(52) U.S. Cl.
CPC .......... *F02N 11/0833* (2013.01); *G01S 19/42* (2013.01); *F02N 2200/0801* (2013.01); *F02N 2200/101* (2013.01); *F02N 2200/102* (2013.01); *F02N 2200/123* (2013.01)

(58) Field of Classification Search
CPC ......... F02N 11/0833; F02N 2200/0801; F02N 2200/101; F02N 2200/102; F02N 2200/123; G01S 19/42

USPC ....................................................... 701/112
See application file for complete search history.

(56) References Cited

U.S. PATENT DOCUMENTS

| | | | |
|---|---|---|---|
| 9,243,570 B2* | 1/2016 | Boesch | F02D 17/04 |
| 9,249,742 B2* | 2/2016 | Sangameswaran | |
| | | | F02N 11/0837 |
| 9,664,136 B2* | 5/2017 | Boesch | F02D 45/00 |
| 10,220,850 B2* | 3/2019 | Naserian | F02D 41/0087 |
| 2008/0040029 A1* | 2/2008 | Breed | B60W 30/16 |
| | | | 701/514 |
| 2012/0323474 A1* | 12/2012 | Breed | G01S 19/42 |
| | | | 701/117 |
| 2013/0238366 A1* | 9/2013 | Morgan | B60R 25/04 |
| | | | 705/4 |
| 2013/0332054 A1* | 12/2013 | Kristinsson | F02N 11/0837 |
| | | | 701/113 |
| 2014/0257679 A1* | 9/2014 | Boesch | F02D 17/04 |
| | | | 701/112 |
| 2015/0197235 A1* | 7/2015 | Yu | B60W 10/08 |
| | | | 701/22 |
| 2015/0275787 A1* | 10/2015 | Dufford | F02D 29/02 |
| | | | 701/102 |
| 2018/0372053 A1* | 12/2018 | Kuretake | F02N 11/0837 |

* cited by examiner

*Primary Examiner* — David Hamaoui
*Assistant Examiner* — John D Bailey
(74) *Attorney, Agent, or Firm* — Mintz Levin Cohn Ferris Glovsky and Popeo, P.C.; Peter F. Corless

(57) ABSTRACT

A method for controlling activation of an ISG system is provided. The method includes obtaining a current vehicle location and determining whether the current vehicle location is within an ISG inhibition area. When the current location of the vehicle is within the ISG inhibition area, an ISG mode is automatically inhibited to prevent the engine from being turned off.

20 Claims, 2 Drawing Sheets

METHOD AND SYSTEM FOR CONTROLLING ACTIVATION OF VEHICLE ENGINE IDLE STOP AND GO

BACKGROUND

Technical Field of the Disclosure

The present disclosure relates to a method and system for controlling activation of vehicle engine idle stop and go, and more particularly, to a method and system that automatically control activation of vehicle idle stop and go based on a vehicle location.

Description of the Related Art

Today, engine idle stop and go systems are used to improve fuel consumption by stopping or disabling the engine of a vehicle based on current vehicle speed. For example, an ISG system turns off the vehicle engine when the vehicle speed is decreased to 0 and the brake pedal is engaged. Once the brake pedal is disengaged and an accelerator pedal is engaged, the engine is typically restarted.

However, the currently developed ISG systems do not consider various driving situations when determining whether to disable the engine as they are limited to the conditions described above. Accordingly, a driver is required to manually disable the ISG system (e.g., by manipulating an ISG button) and also has to manually turn the ISG system back on when the ISG function is desired. That is, these systems do not automatically disable an ISG system based on a current driving situation. A further technology has been developed that provides predefined situations of when to disable an ISG system including a service area or a body of water as an area where the ISG system should be disabled. However, such systems do not automatically detect an area where the ISG area should be disabled and require user input.

The above information disclosed in this section is merely for enhancement of understanding of the background of the disclosure and therefore it may contain information that does not form the prior art that is already known in this country to a person of ordinary skill in the art.

SUMMARY

The present disclosure provides a method and system that control activation of an idle stop and go (ISG) system within a vehicle. The ISG system within a vehicle is capable of disabling an engine within the vehicle to reduce fuel consumption.

According to one aspect of the present disclosure, a method of controlling activation of an idle stop and go (ISG) system may include obtaining a current vehicle location and determining whether the current vehicle location is within an ISG inhibition area. Additionally, in response to determining that the vehicle is within the ISG inhibition area, an ISG mode of the ISG system may be automatically inhibited. The ISG mode may turn off an engine of the vehicle based on a plurality of conditions. The conditions may include the vehicle speed being detected as 0, an accelerator input being detected as 0, and a brake pedal being engaged.

In one exemplary embodiment the ISG inhibition area may be set based on a location of the vehicle where an ISG off input is received. The location where the ISG off input is received may be stored in a memory as a plurality of coordinates. Alternatively, the method may include determining the ISG inhibition area by receiving an ISG off input and obtaining a location of the vehicle where the ISG off input is received. The obtained location of the vehicle may then be compared with previously stored locations. When the obtained location of the vehicle is determined to be within a vicinity of the previously stored locations, the ISG inhibition area may then be set.

In another exemplary embodiment, the method may include setting the ISG inhibition area by receiving an ISG off input and obtaining and storing a location of the vehicle where the ISG off input is received. The obtained location of the vehicle may be compared with previously stored location to determine whether the obtained location of the vehicle is within a vicinity of the previously stored locations. When the obtained location of the vehicle is within a vicinity of the previously stored locations, the obtained vehicle location may be flagged and joined with the previously stored locations into a group. When the group contains a predetermined number of locations that have been flagged, a center point of the locations within the group may be calculated and a boundary of the center point may be set as the ISG inhibition area.

Further, in response to receiving an ISG reactivation input, a closest location may be removed from the group. In particular, the closest location may be a location within the group that is closest to a vehicle location where the ISG reactivation input is received. The ISG inhibition area may then be re-determined by calculating a new center point of the locations within the group. Additionally, the ISG inhibition area may be transmitted to a telematics server. The ISG inhibition area may then be received by a telematics server or may be retrieved from a memory. The vehicle location may also be detected using a global positioning system (GPS).

According to another aspect of the present disclosure, a vehicle may include an engine mounted within the vehicle and an ISG system that is programmed to inhibit an ISG mode based on detecting a current vehicle location within an ISG inhibition area.

According to yet another aspect of the present disclosure, a system may be provided for controlling activation of an ISG of a vehicle. The system may include a memory configured to store program instructions and a processor programmed to execute the program instructions. The program instructions when executed may be configured to obtain a current vehicle location and determine whether the current vehicle location is within an ISG inhibition area. When the current vehicle location is within the ISG inhibition area, an ISG mode of the ISG system may be automatically inhibited.

Notably, the present disclosure is not limited to the combination of the elements as listed above and may be assembled in any combination of the elements as described herein.

Other aspects of the disclosure are disclosed infra.

BRIEF DESCRIPTION OF THE DRAWINGS

The above and other objects, features and advantages of the present disclosure will be more apparent from the following detailed description taken in conjunction with the accompanying drawings.

Figure 1:
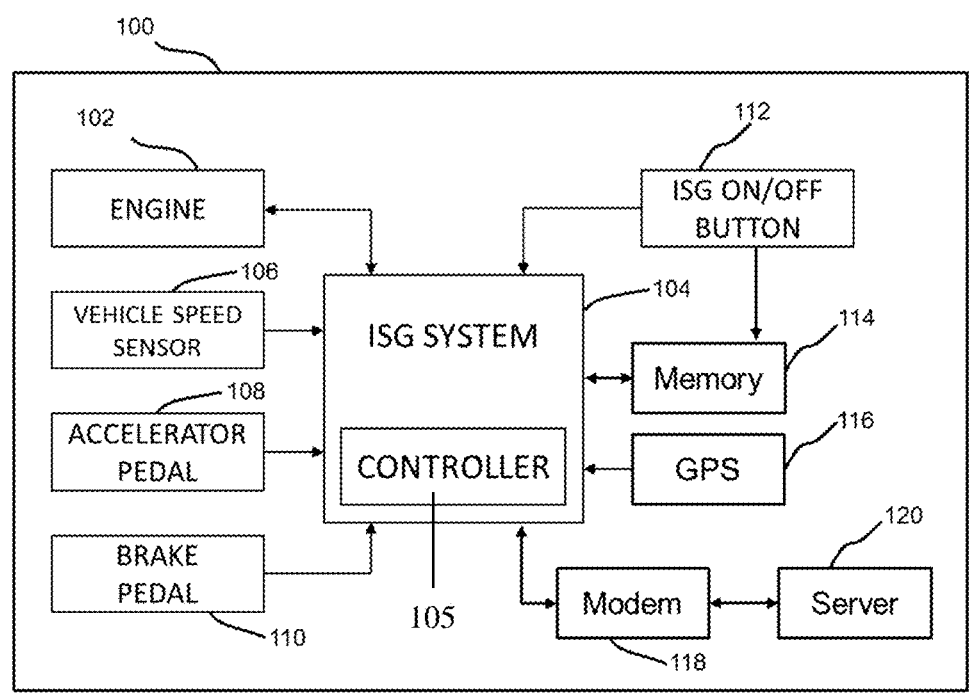
FIG. 1 illustrates a system within an idle stop and go vehicle according to an exemplary embodiment of the present disclosure.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

The present disclosure provides a method and system for controlling activation of an ISG system to automatically inhibit an ISG mode of the ISG system in response to a vehicle location. Accordingly, fuel consumption may still be reduced while providing an improved responsiveness to situations where it is desired for the engine to remain enabled. For example, the system is capable of maintaining the engine on while the vehicle is at a stop sign or any other area as desired by a driver without requiring manual deactivation and reactivation of the system. In particular, the system is capable of learning areas where a driver previously desired to inhibit the ISG system from turning off the engine. Once these areas are learned and stored, the system automatically deactivates and reactivates the ISG system. By providing such a learning system, driver convenience is greatly improved while still improving fuel consumption.

According to an aspect of the present disclosure and as shown in FIG. 1, a vehicle 100 may include an engine 102, an ISG system 104 having a controller 105, and an ISG button 112. The engine 102 and the ISG button 112 may each be in communication with the ISG system 104.

Further, the vehicle 100 may include a vehicle speed sensor 106, an accelerator pedal 108, a brake pedal 110, a global positioning system 116, and a memory 114 in which detected vehicle locations may be stored (e.g., location coordinates may be stored). In particular, the vehicle speed sensor 106 may be configured to detect the current speed of the vehicle 100, the accelerator pedal 108 may include a sensor configured to detect an engagement amount of the pedal, the brake pedal 110 may include a sensor configured to detect an engagement amount of the pedal, and the GPS 116 may be configured to detect a current position of the vehicle 100.

The vehicle 100 may be operated in an ISG mode in which the ISG system 104 disables the engine 102 to reduce overall fuel consumption in areas where the engine is unnecessary (e.g., at a red light or the like) and also automatically restarts the engine 102 based on particular conditions. When the engine 102 is stopped, a battery (not shown) provides current to loads within the vehicle and while the engine is operating, a starter generator provides the current to the loads. In addition, the ISG mode may be triggered based on a plurality of conditions. For example, the ISG mode is triggered when the vehicle speed is detected by the vehicle speed sensor 106 to be 0, the accelerator pedal 108 is disengaged, and the brake pedal 110 is engaged. Then, when the accelerator pedal 108 is engaged or as the brake pedal 110 is disengaged, the ISG system 104 may be configured to automatically restart the engine 102.

Figure 2:
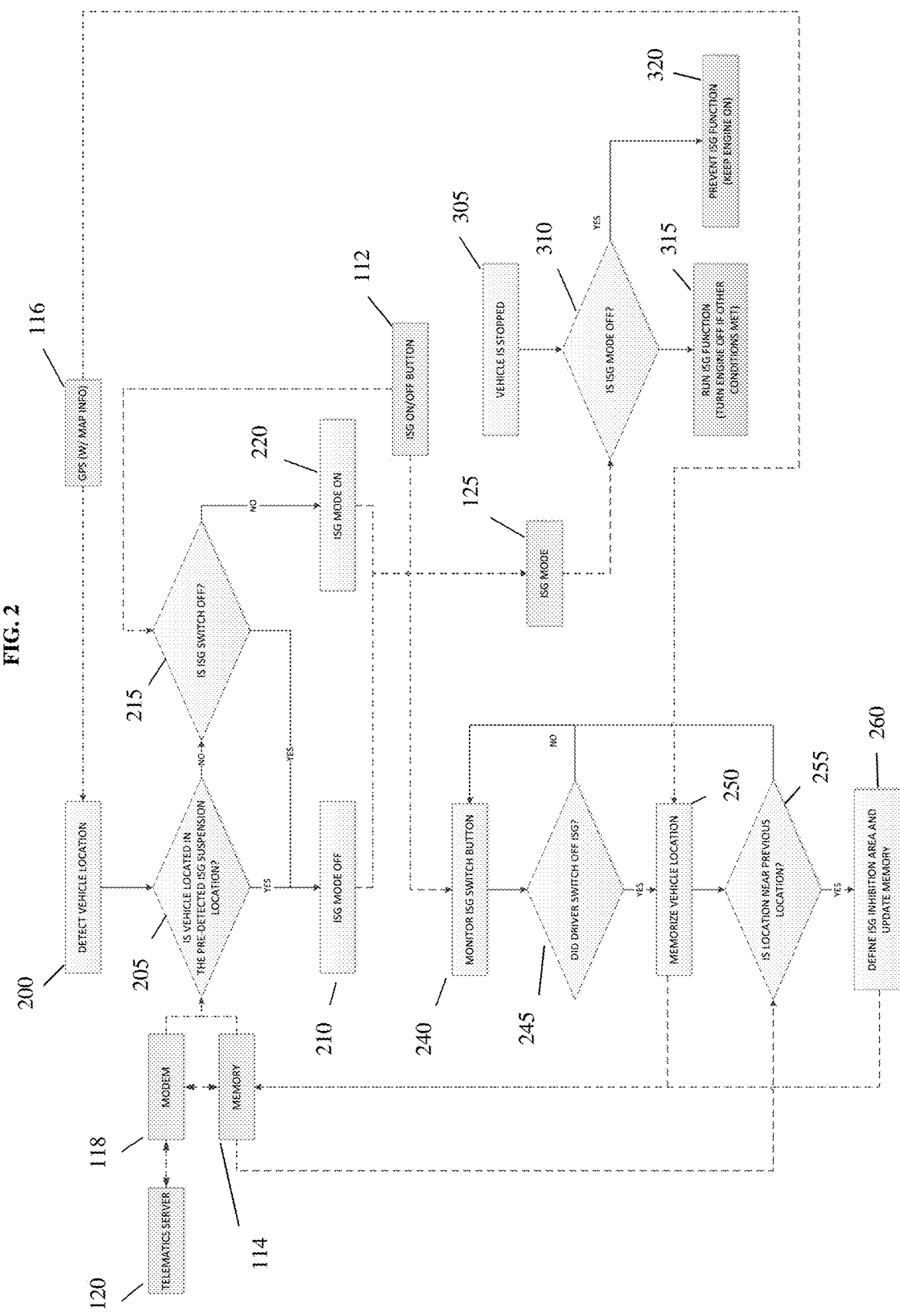
FIG. 2 illustrates a flowchart of a method of controlling activation of vehicle idle stop and go according to an exemplary embodiment of the present disclosure.

However, to enhance the ISG system 104, the present disclosure provides an improved system and method that inhibit the ISG mode based on a vehicle location. In particular, as shown in FIG. 2, the method of controlling activation of the ISG system may include detecting a current vehicle location (200) and determining whether the current vehicle location is within an ISG inhibition area (205). The determination of the ISG inhibition area will be described in further detail below. When the vehicle is not located within the ISG inhibition area, whether the ISG button 112 is off may be determined (215). In other words, the method may include determining whether an ISG switch is on or off based on whether the ISG button is engaged or otherwise manipulated. When the ISG switch is determined to be on based on button manipulation, the ISG mode 125 may be turned on (220) and the ISG mode 125 may be operated. However, if the ISG switch is off, the ISG mode 125 may be inhibited or turned off. Additionally, in response to determining that the current vehicle location is within the ISG inhibition area (e.g., ISG suspension location), the ISG mode 125 may also be inhibited.

In response to determining whether the vehicle is stopped (305), the method may include determining whether the ISG mode is off (310). When the ISG mode is off, the ISG mode or function may be inhibited such that the engine is maintained in an on state (320). However, when the ISG mode is on after the vehicle is stopped, the ISG mode may be enabled (315) and the engine may be turned off based on a plurality of satisfied conditions. The plurality of conditions may include detecting that the vehicle speed is 0, the accelerator pedal is disengaged, and the brake pedal is engaged.

Furthermore, the ISG inhibition area may be determined or set based on a location of the vehicle where an input is received to turn the ISG function off. That is, the method may include monitoring the ISG button 112 (e.g., ISG switch button) to determine whether the ISG button 112 is manually engaged or otherwise manipulated by a driver or user (240). When the ISG button 112 is manipulated to turn off the ISG system (245), the location of the vehicle may be memorized or stored in the memory 114 (250). In other words, the GPS 116 may be used to determine a location of the vehicle at the location where the ISG button was manipulated to transmit an ISG off input to the system and this information may be transmitted to the memory. In response to receiving the ISG off input, the controller 105 of the ISG system 104 may be configured to store the coordinates of the location at which the input was received in the memory 114.

The method may then include determining whether the obtained location of the vehicle 100 is near previous locations (255). In other words, whether the vehicle 100 is within a vicinity of previously stored locations (e.g., within about 50 meters of the previously stored locations) may be determined by comparing the obtained location with the locations stored in the memory 114. By learning and storing the locations each time the ISG button is manipulated, the location where a driver tends to prefer to inhibit the ISG system may be determined. Thus, after having learned these preferences, the system may be automatically operated without user input. Accordingly, if the obtained location of the vehicle 100 is within the previously stored locations, the ISG inhibition area may be defined and the memory 114 may be updated (260). The information may be stored within the memory 114 and may also be transferred to the telematics server 120 via a modem 118 (e.g., a controller area network, Bluelink, or the like). Therefore, the ISG inhibition area may either by retrieved from the memory or may be received at the vehicle by the telematics server.

Additionally, the telematics server may be configured to collect information from a plurality of vehicles (e.g., from a fleet of vehicles) to store a plurality of different ISG inhibition areas. A controller within each vehicle may then be configured to receive updated ISG inhibition area data from the server. Thus, the claimed system is capable of gathering data and providing ISG inhibition areas to vehicle within a fleet to further improve the automatic system response. In other words, the information regarding the ISG inhibition area may also be provided to a controller of a vehicle from a telematics server.

According to another exemplary embodiment of the present disclosure, once the obtained vehicle location has been compared with the previously stored locations to determine that the obtained vehicle location is within the vicinity of the previously stored locations, the obtained vehicle location may be joined with the previously stored locations into a group. In other words, when the user manipulates the ISG off button and the location of the vehicle is near previously stored locations, the new location may be marked or flagged and grouped together with the nearby locations in a memory. The coordinates of these locations may be joined together as group and when the group contains a predetermined number of locations or data points (e.g., three sets of coordinates), a center point of the locations may be calculated. A boundary of the center point may then be set as the ISG inhibition area. For example, when the obtained vehicle location is near two other previously stored locations, the group now contains three data points and a center point of the coordinates of the locations may be calculated to thus determine the ISG inhibition area. In particular, the ISG inhibition area may be defined as a circle with the center point calculated as described above and the radius may be the distance from the center point to a farthest stored location. Then, when the vehicle is driven within the set IS G inhibition area, the ISG mode may be inhibited. The GPS 116 may be used to continuously monitor the vehicle location to determine whether the vehicle 100 is being driven in the ISG inhibition area.

Moreover, when an ISG reactivation input is received, the location of the vehicle may be obtained to determine whether the location is near an ISG inhibition area. If the location of the vehicle where the ISG reactivation input is received is near an ISG inhibition area, a closet location from the group may be removed from the group and unmarked or unflagged. In other words, in response to receiving the ISG reactivation input, the closest stored location may be removed from the memory to thus update the ISG inhibition area. In particular, the ISG inhibition area may be re-determined by calculating a new center point of the locations remaining within the group. For example, a user may determine a location as a place where the ISG mode is desired to be enabled and thus the ISG inhibition area may be easily reconfigured based on user intent.

According to another aspect of the present disclosure, the method described herein may be embodied as a system for controlling an ISG of a vehicle and the system may include a memory configured to store program instructions and a processor programmed to execute the program instructions. The program instructions may be based on the method described herein above. The control logic may also be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

As discussed above, the method and system of the present disclosure are capable of automatically controlling an idle stop and go system of a vehicle based on detecting a current vehicle location. Accordingly, the fuel consumption is capable of being improved while still improving user convenience and preference. Thus, unnecessary fuel consumption is still prevented while avoiding requiring user manipulation each time an ISG system is to be deactivated by learning previous preferences of the user. The above-described method and system improve current ISG logics by taking into account driving situations of the vehicle that are not limited to particular types of locations such as service locations or areas of water. Accordingly, a GPS or navigation system may be used to continuously monitor the location of the vehicle during driving and the vehicle may automatically inhibit the ISG mode when the vehicle is detected to be driving within the ISG inhibition area.

Hereinabove, although the present disclosure is described by specific matters such as concrete components, and the like, the exemplary embodiments, and drawings, they are provided merely for assisting in the entire understanding of the present disclosure. Therefore, the present disclosure is not limited to the exemplary embodiment. Various modifications and changes may be made by those skilled in the art to which the disclosure pertains from this description. Therefore, the spirit of the present disclosure should not be limited to the above-described exemplary embodiments, and the following claims as well as all technical spirits modified equally or equivalently to the claims should be interpreted to fall within the scope and spirit of the disclosure.

What is claimed is:

1. A method of controlling activation of an idle stop and go (ISG) system, comprising:
   obtaining a current vehicle location;
   determining whether the current vehicle location is within an ISG inhibition area; and
   automatically inhibiting an ISG mode of the ISG system in response to determining a vehicle is within the ISG inhibition area,
   wherein the method further includes determining the ISG inhibition area by:
      receiving an ISG off input;
      obtaining and storing a location of the vehicle where the ISG off input is received;
      comparing the obtained location of the vehicle with previously stored locations;
      determining whether the obtained location of the vehicle is within a vicinity of the previously stored locations; and
      in response to determining that the obtained location of the vehicle is within a vicinity of the previously stored locations, flagging and joining the obtained location of the vehicle with the previously stored locations into a group.

2. The method of claim 1, wherein the ISG inhibition area is set based on a location of the vehicle where an ISG off input is received.

3. The method of claim 1, wherein the method further includes determining the ISG inhibition area by:
   receiving an ISG off input;
   obtaining a location of the vehicle where the ISG off input is received;
   comparing the obtained location of the vehicle with previously stored locations; and
   in response to determining that the obtained location of the vehicle is within a vicinity of the previously stored locations, setting the ISG inhibition area.

4. The method of claim 1, further comprising:
   in response to the group containing a predetermined number of locations that have been flagged, calculating a center point of the locations within the group; and
   setting a boundary of the center point as the ISG inhibition area.

5. The method of claim 4, further comprising:
   in response to receiving an ISG reactivation input, removing a closest location from the group, wherein the closest location is a location within the group that is closest to a vehicle location where the ISG reactivation input is received; and
   re-determining the ISG inhibition area by calculating a new center point of the locations within the group.

6. The method of claim 1, wherein a plurality of coordinates are stored as the vehicle location where the ISG off input is received.

7. The method of claim 1, wherein the ISG mode turns off an engine of the vehicle based on a plurality of conditions.

8. The method of claim 7, wherein the conditions include the vehicle speed being detected as 0, an accelerator input being detected as 0, and a brake pedal being engaged.

9. The method of claim 1, further comprising:
   transmitting the ISG inhibition area to a telematics server.

10. The method of claim 1, wherein the ISG inhibition area is received from a telematics server.

11. The method of claim 1, wherein the ISG inhibition area is retrieved from a memory.

12. The method of claim 1, wherein the current vehicle location is detected using a global positioning system.

13. A vehicle, comprising:
    an engine mounted within the vehicle; and
    an idle stop and go (ISG) system programmed to inhibit an ISG mode based on detecting a current vehicle location within an ISG inhibition area,
    wherein the ISG system is further programmed to:
       receiving an ISG off input;
       obtaining and store a location of the vehicle where the ISG off input is received;
       compare the obtained location of the vehicle with previously stored locations;
       determine whether the obtained location of the vehicle is within a vicinity of the previously stored locations; and
       flag and join the obtained location of the vehicle with the previously stored locations into a group in response to determining that the obtained location of the vehicle is within a vicinity of the previously stored locations.

14. The vehicle of claim 13, wherein the ISG mode turns off the engine of the vehicle based on a plurality of conditions.

15. The vehicle of claim 14, wherein the conditions include the vehicle speed being detected as 0, an accelerator input being detected as 0, and a brake pedal being engaged.

16. The vehicle of claim 13, wherein the ISG system is further programmed to:
    calculate a center point of locations within the group in response to the group containing a predetermined number of locations that have been flagged; and
    set a boundary of the center point as the ISG inhibition area.

17. The vehicle of claim 16, wherein the ISG system is further programmed to:
    remove a closest location from the group in response to receiving an ISG reactivation input, wherein the closest location is a location within the group that is closest to a vehicle location where the ISG reactivation input is received; and
    re-determine the ISG inhibition area by calculating a new center point of the locations within the group.

18. The vehicle of claim 13, wherein the current vehicle location is detected using a global positioning system.

19. A system for controlling activation of an idle stop and go (ISG) of a vehicle, comprising:
    a memory configured to store program instructions; and
    a processor programmed to execute the program instructions, the program instructions when executed configured to:
       obtain a current vehicle location;
       determine whether the current vehicle location is within an ISG inhibition area; and
       automatically inhibit an ISG mode of the ISG system in response to determining the vehicle is within the ISG inhibition area,
    wherein to determining the ISG inhibition area, the program instructions when executed are further configured to:
       receiving an ISG off input;

obtaining and store a location of the vehicle where the ISG off input is received;

compare the obtained location of the vehicle with previously stored locations;

determine whether the obtained location of the vehicle is within a vicinity of the previously stored locations; and flag and join the obtained location of the vehicle with the previously stored locations into a group in response to determining that the obtained location of the vehicle is within a vicinity of the previously stored locations.

20. The system of claim 19, wherein the program instructions when executed are further configured to:

calculate a center point of the locations within the group in response to the group containing a predetermined number of locations that have been flagged; and set a boundary of the center point as the ISG inhibition area.

* * * * *